United States Patent [19]

Haferl

[11] 3,881,134

[45] Apr. 29, 1975

[54] RASTER CENTERING CIRCUIT

[75] Inventor: Peter Eduard Haferl, Adliswil, Switzerland

[73] Assignee: RCA Corporation, New York, N.Y.

[22] Filed: May 7, 1973

[21] Appl. No.: 357,759

[52] U.S. Cl. .......... 315/398

[51] Int. Cl. .......... H01j 29/54

[58] Field of Search .......... 315/276 D, 27 TD, 27 R, 315/24, 398

[56] References Cited

UNITED STATES PATENTS

| | | | |
|---|---|---|---|
| 3,489,948 | 1/1970 | Buechel | 315/27 TD |
| 3,646,393 | 2/1972 | Tarr | 315/27 TD |
| 3,683,231 | 8/1972 | Jagatic | 315/27 TD |
| 3,733,513 | 5/1973 | Yoshikawa | 315/27 TD |

*Primary Examiner*—Maynard R. Wilbur
*Assistant Examiner*—J. M. Potenza
*Attorney, Agent, or Firm*—Eugene M. Whitacre; Paul J. Rasmussen

[57] ABSTRACT

A raster centering circuit derives it power from a deflection amplifier and has reduced power consumption through the use of energy storage capacitance. In one embodiment a first capacitor coupled to the deflection winding is charged by deflection current through a first diode during a first portion of the trace interval and discharges through a centering control during a second portion of the trace interval, providing a centering current of one polarlity through the deflection winding. A second capacitor coupled to the deflection circuit charges through a second diode during the retrace interval and discharges through the centering control during the trace interval for producing a centering current of the opposite polarlity through the deflection winding. Adjustment of the centering control determines the net flow of centering current through the deflection winding. In another embodiment the junction of the deflection winding and the deflection winding coupling capacitor is coupled through the centering control and through two parallel oppositely poled diodes to ground such that adjustment of the centering control provides a greater deflection current flow through one of the diodes for producing a negative or positive voltage at the capacitor and winding junction for causing the desired polarity centering current flow through the deflection winding.

9 Claims, 3 Drawing Figures

RASTER CENTERING CIRCUIT

BACKGROUND OF THE INVENTION

This invention relates to circuits for producing a centering current in a deflection winding and particularly to such circuits deriving their power from a deflection amplifier driving the winding.

The most efficient use of a picture tube in a television receiver occurs when the size of the scanned raster is substantially the same size as the picture tube viewing screen. To achieve this condition it is necessary to ensure that the raster is centered on the viewing screen. Variations in components from one receiver to another and variation of component values within a given receiver due to temperature changes or aging may make it necessary to utilize a variable centering control so adjustment may be made as required. The alternative to a centering control circuit is to cause the raster to overscan the viewing area of the picture tube such that slight shifts in the centering will not present an undesirable unscanned edge portion to the viewer. However, such an overscan measure requires additional deflection power which additionally stresses the deflection circuit and the receiver power supply circuits.

The most common approach in the past for providing a centering current through a deflection winding has been to couple a direct current from a power supply source through the deflection winding. While this approach provides adequate centering control it also requires a relatively large amount of power, amounting to about 6 to 8 watts for a large screen color receiver.

In accordance with the invention, a raster centering circuit derives its power from a deflection amplifier which provides scanning current for a deflection winding. A capacitance coupled to a deflection winding and the deflection amplifier is also coupled through unidirectional current conducting means and a centering control impedance means to a point of reference potential for causing the capacitor to be charged by current of one polarity from the amplifier during one portion of each deflection current cycle and for discharging through the centering control causing a centering current to flow through the deflection winding during another portion of each deflection cycle.

In one embodiment of the invention a first capacitance is coupled between one side of a deflection winding coupling capacitor and a first terminal of a unidirectional current conducting device, a second terminal of which is coupled to a point of reference potential. A second capacitance is coupled between the other side of the coupling capacitor and a first terminal of a second unidirectional current conducting device, a second terminal of which is coupled to the point of reference potential, the first and second devices being oppositely poled. A current control means is coupled between the first terminals of the first and second devices and to the junction of the coupling capacitor and the deflection winding.

In another embodiment of the invention a coupling capacitor and a deflection winding are serially coupled between an output terminal of a deflection amplifier and a point of reference potential. A centering current control means is coupled to the junction of the capacitor and deflection winding and to first electrodes of first and second oppositely poled unidirectional current conducting means, second electrodes of which are coupled to a point of reference potential for providing a path for deflection current from the amplifier during one portion of each deflection cycle to charge the capacitor which then discharges through the deflection winding during a second portion of each deflection cycle, the charging and discharging of the capacitor causing a centering current of a predetermined magnitude and polarity to flow through the deflection winding.

A more detailed explanation of two embodiments of the invention is given in the following description and accompanying drawings of which:

BRIEF DESCRIPTION OF THE INVENTION

Figure 1:
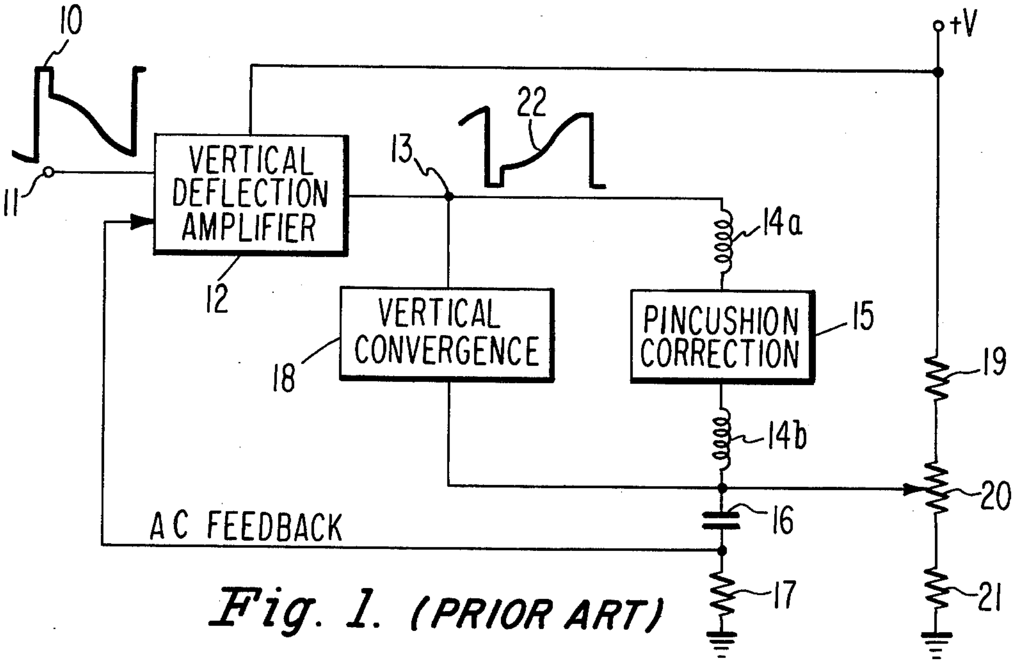
Fig. 1. (PRIOR ART)
FIG. 1 is a diagram partly in block form and partly in schematic form illustrating a prior art deflection and centering circuit.

FIG. 1 is a diagram partly in block form and partly in schematic form illustrating a prior art deflection and centering circuit. A vertical sawtooth generator, not shown, produces a vertical sawtooth waveform 10 defining the vertical trace and retrace intervals of each deflection cycle which is coupled to an input terminal 11 of a vertical deflection amplifier 12. Amplifier 12 may be, for example, any suitable complementary symmetry or quasi-complementary symmetry type amplifier. A positive going sawtooth waveform 22 is obtained from an output terminal 13 of the deflection amplifier. This waveform is coupled through the series arrangement of a first vertical deflection coil 14*a*, a conventional pincushion correction network 15, a second vertical deflection coil 14*b*, a coupling capacitor 16 and a resistor 17 to ground for producing a sawtooth deflection current through vertical deflection coils 14*a*, 14*b*.

A vertical convergence circuit 18, which may be of a conventional type, is coupled in parallel with the vertical deflection coils 14*a* and 14*b* for utilizing the waveform developed across these coils for convergence purposes. A feedback signal developed across deflection current sampling resistor 17 is coupled back to an input terminal of the vertical deflection amplifier to insure linear operation of the circuit.

A source of positive potential +V supplies operating current to the deflection amplifier 12 and is also coupled through a voltage divider comprising series connected resistor 19, potentiometer 20 and resistor 21 to ground. The wiper arm of potentiometer 20 picks off a voltage which causes a desired centering current to flow through the vertical coils 14*a* and 14*b*. The average DC voltage developed at the junction of coil 14*b* and coupling capacitor 16 may be in the order of 10–15 volts. Hence, the setting of potentiometer 20 at a point above or below this average DC voltage will cause a direct current of the desired polarity to flow through the coils. Hence, potentiometer 20 acts as a centering control as the direct current through the deflection coils may be selected to shift the scanned raster up or down on the faceplate of a television receivier picture tube.

One characteristic of the centering circuit shown in FIG. 1 is that a relatively large amount of power is consumed by the voltage divider and deflection coils. This power may amount to about 6–8 watts in a large television picture tube. Another characteristic of the circuit in FIG. 1 is that coupling capacitor 16 must be placed on the ground side of the deflection coils in order to allow a centering current of either polarity to flow through the coils. Therefore, the centering current does not flow through the deflection current sampling resistor 17 and, hence, some nonlinearities may be added to the deflection system. Further, the vertical convergence circuit being in parallel with the deflection coils 14*a* and 14*b* and isolated from ground may introduce additional non-linearities if the loading of the vertical convergence circuitry changes due to convergence adjustments or convergence component value changes.

Figure 2:
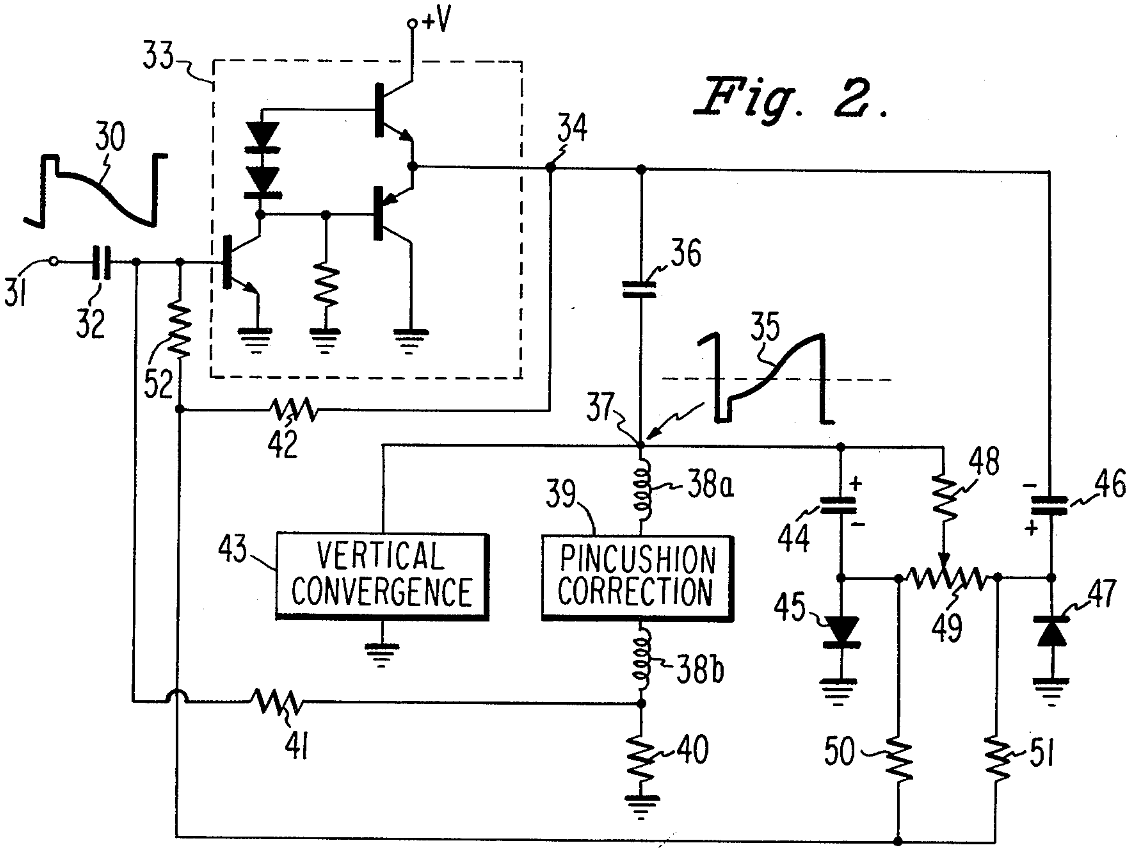
FIG. 2 is a partly schematic and partly block diagram of one embodiment of a deflection and centering circuit according to the invention.

FIG. 2 is a partly schematic and partly block diagram of one embodiment of a deflection and centering circuit according to the invention. A vertical deflection rate sawtooth generator, not shown, produces sawtooth pulses 30 which are coupled to a terminal 31 and through a coupling capacitor 32 to an input terminal of a vertical deflection amplifier 33. By way of illustration, vertical deflection amplifier 33, shown within the dotted lines, is a conventional complementary symmetry amplifier. The output terminal 34 of amplifier 33 is coupled through a coupling capacitor 36 and through the series arrangement of a terminal 37, a vertical deflection coil 38*a*, a conventional pincushion correction network 39, another vertical deflection coil 38*b*, and a current sampling resistor 40 to ground. A sawtooth waveform 35 containing positive and negative portions with respect to an axis is developed at terminal 37. Conventional vertical convergence circuitry 43 is coupled from the junction of coupling capacitor 36 and vertical deflection coil 38*a* to ground. With this arrangement, unlike the arrangement of FIG. 1, variations in the current flowing through the vertical convergence circuitry are not sampled by the feedback resistor 40. This arrangement eliminates one possible source of nonlinearities in the deflection system. A DC feedback path comprising series connected resistors 42 and 52 is coupled from the output terminal 34 of the deflection amplifier 33 to the input terminal of the amplifier. An AC feedback path is coupled from the junction of vertical coil 38*b* and current sampling resistor 40 through a resistor 41 to the input terminal of the amplifier.

Output terminal 34 of the deflection amplifier is also coupled through a capacitor 46 and a diode 47 to ground. Terminal 37 is coupled through a capacitor 44 and a diode 45 to ground. Diodes 45 and 47 are oppositely poled in the circuit with respect to ground. A centering control potentiometer 49 is coupled between the anode of diode 45 and the cathode of diode 47. A centering current limiting resistor 48 is coupled between the wiper arm of potentiometer 49 and terminal 37.

Series connected resistors 50 and 51 are coupled in parallel with potentiometer 49 and the junction of these resistors is coupled to the junction of resistors 52 and 42 in the DC feedback path of the amplifier. The purpose of resistors 50 and 51 will be described subsequently.

The operation of the centering current circuit in FIG. 2 utilizes the principle of charge storage for reducing the power requirements for a given centering current to about half that of the conventional circuit illustrated in FIG. 1. During operation it will be initially assumed that the wiper arm centering current control potentiometer 49 is moved all the way towards diode 45. During the positive portion of waveform 35 capacitor 44 is charged by the deflection current obtained from coupling capacitor 36 through diode 45 to ground. This current charges capacitor 44 with the polarity as indicated. During this positive portion of the deflection cycle the charging current for capacitor 44 is diverted from the deflection coils 38*a* and 38*b* and hence forms an effective centering current in a direction opposite to that of the deflection current, i.e., from ground up through the deflection coils. During the negative portion of the deflection waveform 35 capacitor 44 discharges from its positive terminal through resistor 48 to its negative terminal. The current which was previouslyl diverted from the deflection coils is now replenished to capacitor 36 by an increased current from ground up through the deflection coils and to capacitor 36. Thus, the diversion of current from the deflection coils during the positive half interval of the deflection cycle with a resultant depletion of charge in capacitor 36 caused by charging of capacitor 44 and the replenishing of energy to capacitor 36 during the negative half cycle portion forms the DC centering current through the deflection coils in a first direction. Adjustment of potentiometer 49 determines the discharge rate of capacitor 44 through resistor 48. The amount of charge left on capacitor 44 will determine how much charge it absorbs during the next positive portion of the deflection cycle and, hence, will determine the effective centering current through the deflection coils.

Centering current in the opposite direction, i.e., through the deflection coils to ground, is supplied by that portion of the circuit including capacitor 46 and diode 47. Diode 47 conducts during the negative retrace portion of the waveform 35 of each deflection cycle, charging capacitor 46 with the polarity as indicated. This puts a positive charge on capacitor 36 at its junction with coil 38*a*. At the end of the retrace interval when capacitor 46 no longer charges, it discharges through potentiometere 49, resistor 48 and the circuit including coils 38*a* and 38*b* to ground, thus generating a DC centering current through the coils in the opposite direction from that generated by the centering circuit including capacitor 44 and diode 45. Adjustment of potentiometer 49 determines the relative amount of the two opposite direction centering currents through the coil and, hence, determines the direction and amount of the net centering current.

It should be noted that the AC feedback path providing feedback from current sampling resistor 40 through resistor 41 to the input terminal of the amplifier is DC coupled to the amplifier input terminal rather than being coupled to the other side of coupling capacitor 32. This arrangement reduces picture bounce during television receiver channel switching when the sync circuits, including the vertical sync circuits, are interrupted and reduces bouncing caused by interference due to noisy vertical sync signals. However, with this arrangement the voltage drop across the sampling resistor 40 caused by the centering current is added to the feedback signal applied to the input terminal of deflection amplifier 33. Unless steps were taken to overcome this, it would be necessary to operate the deflection amplifier at a higher operating potential as the DC operating point of the amplifier would be changed by this additional feedback. This would result in higher dissipation across the two output power transistors.

To eliminate this problem caused by the operating point shift, resistors 50 and 51 are coupled from the anode and cathode of respective diodes 45 and 47 to a common point at the junction of resistors 42 and 52 in the amplifier DC feedback path. With this arrangement, use is made of the voltages developed across respective diodes 45 and 47 during the trace and retrace interval portions of each deflection cycle. The voltage at the junction of resistors 50 and 51 is of opposite polarity to the voltage developed across sampling resistor 40 due to the centering circuit. Hence, the voltage applied to the DC feedback path of the amplifier bucks the DC component of the AC feedback voltage caused by the centering current and the amplifier operating point remains relatively stable independent of the centering current.

Figure 3:
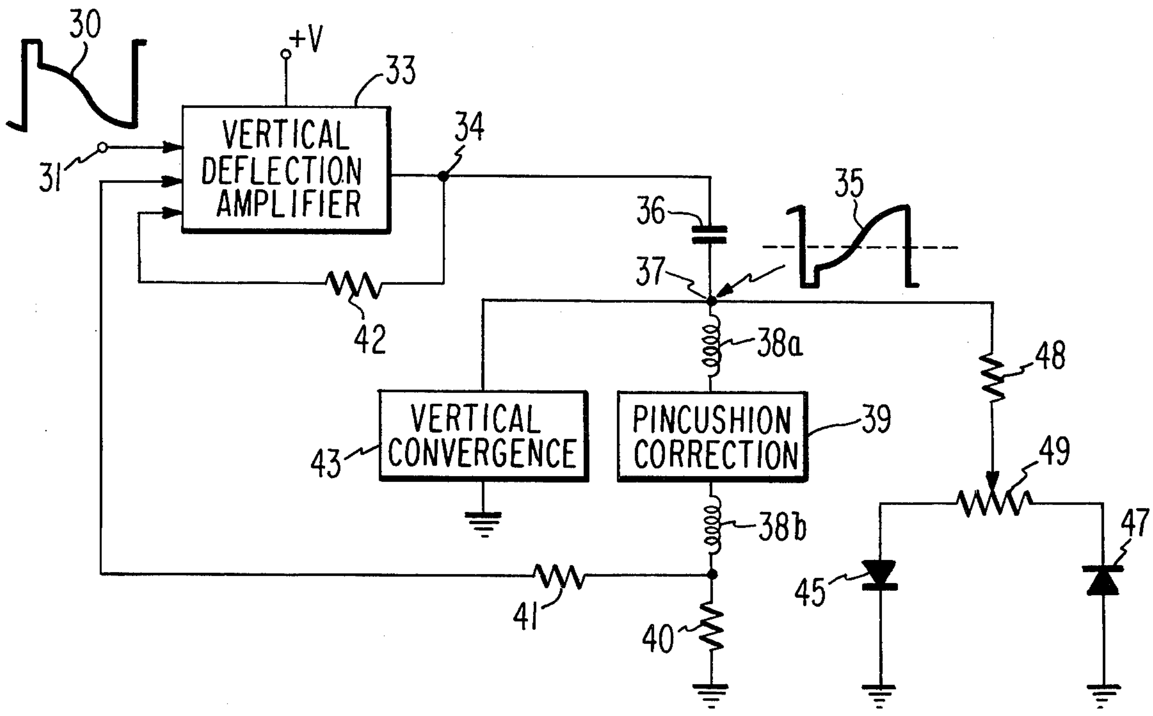
FIG. 3 is a partly schematic and partly block diagram of another embodiment of a deflection and centering circuit according to the invention.

FIG. 3 is a partly schematic and partly block diagram of another embodiment of a deflection and centering circuit according to the invention. The circuit illustrated in FIG. 3 is similar to the circuit of FIG. 2 in that about only half of the total power is required for a given centering current compared to a conventional circuit such as illustrated in FIG. 1. The circuit of FIG. 3 utilizes the principle of charge storage during one portion of the deflection cycle for creating a centering current for the remainder of each deflection cycle. In FIG. 3 a coupling capacitor 36 is the only capacitance required for this purpose, eliminating the need for the capacitors 44 and 46 which were utilized for this purpose in the circuit of FIG. 2. The remainder of the circuit of FIG. 3 is essentially the same as that of FIG. 2 and those components which perform similar functions to the corresponding components in FIG. 2 are labelled with the same reference numerals as in FIG. 2.

In FIG. 3 the vertical deflection amplifier 33 output terminal 34 is coupled through a coupling capacitor 36 through the series arrangement of a first vertical deflection coil **38*a*, a pincushion correction circuit 39, a second vertical deflection coil 38*b* and a current sampling resistor 40 to ground. A vertical convergence network 43 of conventional design is coupled from terminal 37 to ground to yield the advantages described in conjunction with FIG. 2. Terminal 37 is coupled through a centering current limiting resistor 48 and through a portion of potentiometer 49 and a diode 47 to ground and through another portion of potentiometer 49 through a diode 45 to ground. Diodes 45 and 47 are oppositely poled for conducting current to charge the coupling capacitor 36 to respective different polarities during the respective positive and negative portions of waveform 35** during each deflection cycle.

DC feedback is provided from amplifier output terminal 34 to its input terminal through resistor 42. AC feedback for the amplifier, derived from the side of coupling capacitor 36 remote from output terminal 34 and specifically at the junction of coil **38*b* and resistor 40, is coupled through a resistor 41** to the input terminal of the deflection amplifier.

During the positive portion of sawtooth deflection waveform 35, deflection current is conducted from coupling capacitor 36 through resistor 48, potentiometer 49 and diode 45 to ground. This depletes a portion of the charge on capacitor 36 and, hence, lowers the amount of scanning current going through the deflection coils to ground by the amount of the diverted current. This results in an effective DC centering current traversing upwards from ground through resistor 40 and the two deflection coils **38*a* and 38*b*. During the negative portion of sawtooth waveform 35 during each deflection interval, there is a DC current also upwards through resistor 40, coils 38*a* and 38*b*, from ground to replenish the charge on capacitor 36 which was depleted during the positive portion of waveform 35. This replenishing current constitutes the DC centering current through the coils during the second or negative portion of each deflection interval. Hence, as determined by the setting of centering control potentiometer 49** a selected amount of centering current will traverse the deflection coils in a first direction during each deflection cycle.

To generate a DC centering current in the opposite direction, i.e., downwards from the coupling capacitor through deflection coils **38*a* and 38*b* and resistor 40 to ground, potentiometer 49 is adjusted toward the cathode of diode 47. In this manner, during the negative portion of each deflection cycle, current will be drawn from ground through diode 47, potentiometer 49 and resistor 48 to positively charge the bottom terminal of capacitor 36. This current through diode 47 to capacitor 36** is in a direction to decrease the scanning current through the deflection coils during this portion of the deflection cycle and, hence, acts as an effective DC centering current through the coils in the opposite direction from the scanning current.

During the positive portion of the deflection cycle, the extra charge accumulated on capacitor 36 is discharged through the deflection coils and resistor 40 to ground, continuing the effective DC centering current through the coils.

Depending on the adjustment of potentiometer 49 the centering current in one direction can be made greater than in the other or the two centering currents can be made equal resulting in the desired direction and magnitude of the net centering current.

What is claimed is:

1. A raster centering circuit, comprising:

a deflection amplifier including an output terminal providing an alternating current during each deflection cycle;

a capacitor, a deflection winding and a feedback resistor serially coupled in that order between said output terminal and a point of reference potential for receiving deflection scanning current from said amplifier, the junction of said deflection winding and said feedback resistor being coupled to an input terminal of said deflection amplifier;

centering current control means having a first terminal coupled to the junction of said capacitor and said deflection winding; and a unidirectional current conducting device coupled between a second terminal of said current control means and said point of reference potential for conducting deflection current of one polarity during a first portion of each deflection cycle for causing an effective centering current in a first direction through said deflection winding and for charging said capacitor such that said charge causes a centering current in said first direction in said deflection winding during a second portion of each deflection cycle when said deflection current is of the other polarity, all of said deflection and centering current passing through said feedback resistor for minimizing nonlinearities caused by said centering current.

2. A raster centering circuit comprising:

a deflection amplifier including an output terminal for providing an alternating current during each deflection cycle;

a capacitor, a deflection winding and a feedback resistor serially coupled in that order between said output terminal and a point of reference potential for providing a path for scanning current from said amplifier, the junction of said deflection winding and said feedback resistor being coupled to an input terminal of said deflection amplifier;

impedance means including first, second and third terminals, said first terminal being coupled to the junction of said capacitor and said deflection winding;

first unidirectional current conducting means having its main current conduction path coupled between said second terminal and a point of reference potential and poled for conducting deflection current during a first polarity portion of each deflection cycle and charging said capacitor such that a centering current in a first direction flows in said deflection winding during a second polarity portion of each deflection cycle; and second unidirectional current conducting means having its main current conduction path coupled between said third terminal and a point of reference potential and poled for conducting deflection current during said second polarity portion of each deflection cycle and charging said capacitor such that a centering current in a second direction flows in said deflection winding during said first polarity portion of each deflection cycle, all of said deflection and centering current passing through said feedback resistor for minimizing nonlinearities caused by said centering current.

3. A raster centering circuit according to claim 2 wherein said impedance means includes a variable resistance coupled to said first, second and third terminals such that the impedance between said first and second and said first and third terminals can be adjustably selected for determining said centering currents in said first and second directions.

4. A raster centering circuit according to claim 3 wherein said first and second unidirectional current conducting means are diodes.

5. A raster centering circuit comprising:

a deflection amplifier including an input terminal and an output terminal providing an alternating current during each deflection cycle;

a first capacitor, a deflection winding and a feedback resistor serially coupled in that order between said output terminal and a point of reference potential, the junction of said deflection winding and said feedback resistor being coupled to an input terminal of said deflection amplifier;

a second capacitor and a first unidirectional current conducting device serially coupled from said output terminal to a point of reference potential;

a third capacitor and a second unidirectional current conducting device oppositely poled from said first device serially coupled from the junction of said first capacitor and said deflection winding to said point of reference potential; and centering current control means including impedance means having respective first and second terminals coupled between the respective junctions of said second capacitor and said first device and said third capacitor and said second device, a third terminal on said impedance means being coupled to said junction of said first capacitor and said deflection winding such that deflection current of one polarity charges said second capacitor through said first device during a first portion of each deflection cycle, said second capacitor being discharged through said impedance means during a second portion of each deflection interval, for producing a centering current in a first direction and such that deflection current of the other polarity charges said third capacitor through said second device during said second portion of each deflection cycle, said third capacitor being discharged through said impedance means during said first portion of each deflection cycle for producing a centering current in a second direction, all of said deflection and centering current passing through said feedback resistor for minimizing nonlinearities caused by said centering current.

6. A raster centering circuit according to claim 5 wherein said impedance means includes a variable resistance coupled to said first, second and third terminals such that the impedance between said first and second and said first and third terminals can be adjustably selected for determining said centering currents in said first and second directions.

7. A raster centering circuit according to claim 6 wherein said first and second unidirectional current conducting devices are diodes.

8. A raster centering circuit comprising:

a deflection amplifier including an output terminal for providing an alternating current during each deflection cycle;

a capacitor and a deflection winding serially coupled between said output terminal and a point of reference potential for providing a path for scanning current from said amplifier;

impedance means including a variable resistance coupled to first, second and third terminals, said first terminal being coupled to the junction of said capacitor and said deflection winding;

a first diode coupled between said second terminal and a point of reference potential and poled for conducting deflection current during a first polarity portion of each deflection cycle and charging said capacitor such that a centering current in a first direction flows in said deflection winding during a second polarity portion of each deflection cycle;

a second diode coupled between said third terminal and a point of reference potential and poled for conducting deflection current during said second polarity portion of each deflection cycle and charging said capacitor such that a centering current in a second direction flows in said deflection winding during said first polarity portion of each deflection cycle;

a first deflection current sampling resistor coupled between said winding and said point of reference potential;

a first feedback path coupled from the junction of said sampling resistor and said winding to an input terminal of said deflection amplifier;

second and third resistors serially coupled with each other in parallel with said variable resistor; and a second feedback path coupled from the junction of said second and third resistors to said input terminal to offset the effects of centering current feedback signal developed across said first resistor.

9. A raster centering circuit comprising:

a deflection amplifier including an input terminal and an output terminal providing an alternating current during each deflection cycle;

a first capacitor and a deflection winding serially coupled between said output terminal and a point of reference potential;

a second capacitor and a first diode serially coupled from said output terminal to a point of reference potential;

a third capacitor and a second diode oppositely poled from said first diode serially coupled from the junction of said first capacitor and said deflection winding to said point of reference potential;

centering current control means including a variable resistance having respective first and second terminals coupled between the respective junctions of said second capacitor and said first diode and said third capacitor and said second diode, a third terminal on said variable resistance being coupled to said junction of said first capacitor and said deflection winding such that deflection current of one polarity charges said second capacitor through said first diode during a first portion of each deflection cycle, said second capacitor being discharged through said variable resistance during a second portion of each deflection interval, for producing a centering current in a first direction and such that deflection current of the other polarity charges said third capacitor through said second diode during said second portion of each deflection cycle, said third capacitor being discharged through said variable resistance during said first portion of each deflection cycle for producing a centering current in a second direction;

a first deflection current sampling resistor coupled between said winding and said point of reference potential;

a first feedback path coupled from the junction of said sampling resistor and said winding to an input terminal of said deflection amplifier;

second and third resistors serially coupled with each other in parallel with said variable resistor; and a second feedback path coupled from the junction of said second and third resistors to said input terminal to offset the effects of centering current feedback signal developed across said first resistor.

* * * * *

UNITED STATES PATENT OFFICE
CERTIFICATE OF CORRECTION

PATENT NO. : 3,881,134

DATED : April 29, 1975

INVENTOR(S) : Peter Eduard Haferl

It is certified that error appears in the above-identified patent and that said Letters Patent are hereby corrected as shown below:

On the title sheet, the following should be inserted -- Foreign Application Priority Data, May 12, 1972, Great Britain, 22339/72 --.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*